United States Patent Office 3,320,210
Patented May 16, 1967

3,320,210
PROCESS FOR PREPARING CHLORINATED POLY-
CARBONATES AND POLYESTERS
John R. Caldwell and Winston J. Jackson, Jr., Kingsport,
Tenn., assignors to Eastman Kodak Company, Rochester, N.Y., a corporation of New Jersey
No Drawing. Filed Jan. 24, 1964, Ser. No. 339,887
9 Claims. (Cl. 260—47)

The present invention concerns novel chlorinated polycarbonates and polyesters which exhibit substantially improved properties rendering them useful for a wide variety of applications, and further concerns the process for preparing these polymers.

This application is a continuation-in-part of applicants' copending application Serial No. 292,139, filed July 1, 1963, which in turn is a continuation-in-part of application Serial No. 137,980, filed September 14, 1961, now abandoned.

It is known that the incorporation of chlorine into polymers generally will improve certain properties thereof, such as their resistance to burning. One such type of polymer is that prepared from bisphenols wherein the chlorine is substituted at one or more of several sites on the para-phenylene nucleus. Such polymers are prepared by chlorinating the bisphenol prior to polymerization thereof. This chlorination is not a smooth, stoichiometric reaction, but rather one which often produces contaminating byproducts rendering useful polymerization of the gross chlorination product impossible. Moreover, the production of a gross chlorination product consistent in its chlorine content (particularly at lower chlorine levels) is exceedingly difficult due to the differential fractionating character thereof resulting from the various degrees of chlorination of the bisphenol nuclei achieved.

Objects of the present invention, therefore, are: to provide a variety of polycarbonates and polyesters chlorinated to the desired degree and hence especially useful for particular applications; to improve the nonflammability, the heat-distortion resistance, the tensile strength, and other such properties of fibers, films, molded articles, and other formed articles of polycarbonates and polyesters; and to provide a commercially practicable process for preparing these polymers in a manner producing regulatable and consistent polymer properties.

These and other objects hereinafter becoming evident have been achieved in accordance with the present invention through the discovery that when the polycarbonates or polyesters are prepared from bisphenols in which the bivalent connecting radical of the bisphenol contains a three-dimensional polycyclic structure containing an atomic bridge, the polymers can be readily chlorinated, as hereinafter described, to the degree necessary for achieving the aforesaid desirable properties. This chlorination is not of the phenylene nuclei, but rather of the aforesaid polycyclic constituents. In all of the bisphenols useful herein, the two phenol groups are attached to a single carbon atom of the bivalent connecting radical. Bisphenols having this linkage can be called "gem-bisphenols." The chlorination goes very smoothly and progressively, thus making it very easy to regulate the degree thereof.

The polymers which may be chlorinated in accordance with the present invention to give the present improved products are those having an inherent viscosity of at least about 0.4 and containing at least about 10% and preferably at least about 35% by weight of the recurring structural unit having the general formula

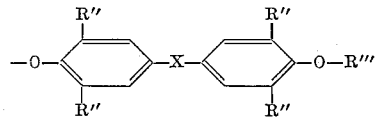

wherein the several R″ may be the same or different and are members selected from the group consisting of hydrogen atoms, halogen atoms, and alkyl radicals containing from 1 to 4 carbon atoms, R‴ is a member selected from the group consisting of the residue of a bifunctional corboxylic acid precursor having up to 40 carbon atoms selected from the group of precursors consisting of carbonic acid, hydroxy-carboxylic acids, and dicarboxylic acids, and a carbonyl group, and X is a gem-bivalent radical having a saturated polycyclic three-dimensional structure which includes a saturated bicyclic atomic bridged hydrocarbon ring member.

The inherent viscosity of these novel chlorinated polymers is determined in chloroform as shown in applicants' above-referred to parent copending application U.S. Serial No. 292,139.

Typical of some three-dimensional polycyclic structures is the norbornane ring. The conventional method of drawing this ring is as follows:

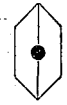

An approximate representation which shows the three-dimensional nature of the ring is as follows:

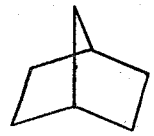

Within the gem-bivalent connecting radical, the single carbon atom to which the two phenol nuclei of the bisphenol are connected may be a carbon within the polycyclic structure, or it may be a —CH< group attached to the polycyclic structure. In 4,4′-(2-norbornylidene) diphenol, the phenolic groups are attached directly to a carbon atom within the polycyclic structure:

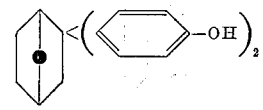

In 4,4′-(2-norbornylmethylene)diphenol, a methylidyne group attached to the polycyclic structure carries the phenolic groups:

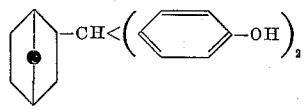

There may be additional saturated rings in the polycyclic structure in addition to the bicyclic member which contains the atomic bridge. These may be joined by fused or spiro-union linkage in the polycyclic structure. Atomic bridges may also occur in the additional member rings of the polycyclic structure. There may be alkyl, halogen, or aromatic substituents in the connecting radical. The atomic bridge within the polycyclic structure may have more than one carbon atom, e.g., (bicyclo[2.2.2]octane)

There may be more than one bridge in the polycyclic structure: e.g., (tricyclo[2.2.1.0²,⁶]heptane)

(adamantane)

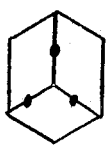

The atomic bridge may consist of an oxygen or nitrogen atom instead of carbon: e.g., (7-oxabicyclo[2.2.1]-heptane)

There may be alkyl, aryl and halide substituents on the polycyclic structure: e.g., (substituted norbornane)

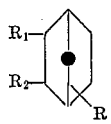

R, $R_1$, and $R_2$=H, halogen, alkyl ($C_1$–$C_4$), and aryl. Also, two substituents may be attached to the same carbon atom. Of course all of these substituents must be in positions which do not interfere with formation of the bisphenol. Because of steric effects, certain bisphenols cannot be obtained, e.g., those from some norbornane derivatives with two alkyl or halogen substituents in the 3 or 7 positions.

Additional saturated rings may be fused to the bicyclic bridged ring member in the polycyclic structure. These may be hydrocarbon or heterocyclic rings, e.g., (hexahydro-4,7,-methanoindane)

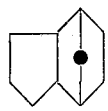

(octahydro-4,7-methanoisobenzofurane)

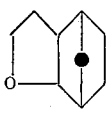

There may be additional bridges in the fused rings, e.g., (decahydro-1,4,5,8-dimethanonaphthalene)

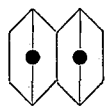

(dodecahydro - 4,9,5,8 - dimethano - 1 - cyclopenta(b)naphthalene)

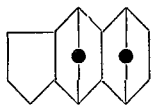

Additional saturated rings may be joined in the polycylic structure by spiro-union linkage, e.g., (spiro[cyclopropane-1,7'-norbornane])

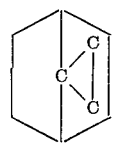

Linear polycarbonates can be prepared by condensation of phosgene or a bischloroformate of a diol, or a mixture of these, with one or more diols, including those disclosed in U.S. Patent 3,030,335 and including the novel three-dimensional polycyclic bisphenols. It will be apparent that the polycarbonates formed by condensing either phosgene or diol bischloroformates with the same or different diols, can be described as consisting essentially of recurring residues of carbonic acid and the diols. By condensing the bischloroformate of one diol with another diol, homogeneous polycarbonates having regularly recurring residues will be obtained, whereas copolycarbonates will be obtained having randomly recurring residues when a mixture of diols are condensed with phosgene.

Linear dicarboxylic acid polyesters can be prepared by condensation of one or more organic dicarboxylic acids, or dicarboxylic acid diesters, with one or more diols including at least in part one of the polycyclic bisphenols contemplated by the present invention. By whatever condensation process the polyesters are formed they can be described as polymers consisting essentially of condensation residues of dicarboxylic acids and diols.

According to the invention, at least 10 mole percent (preferably at least 35 percent) of the linear condensation polymer is composed essentially of residues of one of the bisphenols having a bridged-polycyclic-ring structure in the gem-bivalent connecting radical of the bisphenol. The invention includes mixed polymers, interpolymers, and random copolymers as well as the simpler polymers having as constituents only one acid residue and only one bisphenol residue in recurring groups. The monomers and polymers containing these polycyclic nuclei and their preparations are fully described in the aforesaid parent applications Serial No. 137,980, now abondoned, and Serial No. 292,139. A particularly useful and preferred group of polymers are those wherein X is selected from the group consisting of

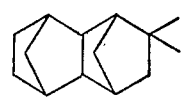

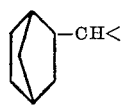

and

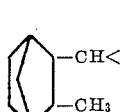

*Bisphenol polycarbonates*

Polycarbonates from bisphenols may be prepared by adding phosgene and/or a bischloroformate of a diol, to a cooled, stirred aqueous mixture containing sodium hydroxide, the bisphenol, a catalyst, and methylene chloride. On further stirring the polymer builds up in the methylene chloride phase.

A bisphenol (residue shown by —O—B—O—) and phosgene give recurring structural units in the polymer of:

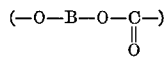

A bisphenol and a bischloroformate of a diol, residue shown by

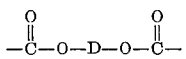

give recurring structural units of:

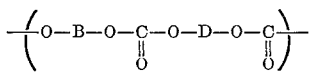

The diol from which the bischloroformate is prepared may be aromatic, aliphatic, or alicyclic, and may be primary, secondary, or tertiary. The carbon chain of aliphatic diols may be straight, or branched, and may contain from 2 to 20 carbon atoms. Examples of diols are ethylene glycol; 1,6-hexanediol; 1,4-hexanediol; 1,4-cyclohexanedimethanol; p-xylylenediol; 2,5-norbornanediol; trans-1,4-cyclohexanediol; 2,5-dimethyl - 2,5 - hexanediol; hydroquinone; and 4,4'-isopropylidenediphenol. Also any of the following groups may be present in the molecule (R=alkyl or aryl): —R$_2$C—, —O—,

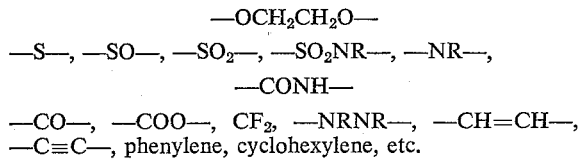

—C≡C—, phenylene, cyclohexylene, etc.

Bisphenol polyesters

The dicarboxylic acid polyesters of this invention are prepared by condensing the novel polycylic bisphenols with dicarboxylic acids by ester interchange reactions between the novel bisphenols and esters of aliphatic, cycloaliphatic, and aromatic dicarboxylic acids. Phenyl or cresyl esters of the dicarboxylic acids are convenient to use. Suitable aliphatic dicarboxylic acids include oxalic, dimethylmalonic, succinic, glutaric, adipic, pimelic, azelaic, sebacic, and 2-methyladipic. Suitable cycloaliphatic acids include cyclohexane-1,4-dicarboxylic acid, cyclohexane-1,3-dicarboxylic acid, cyclopentane-1,3-dicarboxylic acid, and 2,5-norbornane-dicarboxylic acid. Either cis- or trans- forms of the acids may be used. Suitable aromatic dicarboxylic acids include terephthalic, isophthalic, t-butylisophthalic, diphenic, 4,4'-sulfonyldibenzoic, 4,4'-oxydibenzoic, and 2,5-naphthalene-dicarboxylic. Other suitable acids are those found in column 7 of U.S. Patent 2,720,506. Mixtures containing two or more acids, two or more bisphenols or an aliphatic or cycloaliphatic glycol with the bisphenol may be used to give copolyesters.

Bisphenols which may be added with the polycyclic bisphenols to give copolyesters include 4,4'-isopropylidene-diphenol (commonly known as bisphenol A), 4,4'-isopropylidenebis[2,6 - dichlorophenol], 4,4' - isopropylidenebis[2,6 - dibromophenol], cyclohexylidenediphenol, cyclohexylmethylenediphenol, 4,4'-sulfonyldiphenol, 4,4'-oxydiphenol, 4,4' - dihydroxydiphenyl, 4,4' - methylene-diphenol, hydroquinone, resorcinol, 1,4-naphthalenediol, 2,5-naphthalenediol, and other biphenols listed in U.S. Patent 3,030,335.

The chlorinations are carried out by passing chlorine into solutions of the polymers in chlorinated aliphatic or aromatic hydrocarbons while illuminating with ultraviolet or visible light or while periodically adding a free-radical catalyst. The free radical initiators useful in the present invention may be selected from the group consisting of inorganic peroxy, organic peroxy and azo compounds and redox systems. Examples of such initiators are: $H_2O_2$ and the alkali metal persulfates; acetyl peroxide, dibenzoyl peroxide, t-butyl peroxide and benzoyl peroxide, α,α'-azobisisobutyronitrile and p-methoxy-benzene diazo thio-2-naphtthyl ether; and lauroyl peroxide - triphenylamine, or ammonium persulfate-sodium bisulfite; respectively. It is sometimes advantageous to use both a catalyst and illumination. The reactions may be carried out at 0–100° C., but temperatures of 10–35° C. are preferred. Appreciable degradation of the polymers takes place at the higher temperatures, and chlorination proceeds very slowly at lower temperatures. In general, it may be said that any compound and technique which can release a chlorine-free radical for chlorinating hydrocarbons may be employed. For example, in addition to the above means, compounds such as tertiarybutyl hypochlorite, $PCl_5$, and sulfuryl chloride, when heated to at least about 50° C., will cause chlorination. The chlorinations may be carried out in various chlorinated aliphatic and aromatic hydrocarbons which are solvents for the polymers. These include methylene chlorine, ethylene dichloride, chloroform, pentachloroethane, chlorobenzene, dichlorobenzene, and preferably tetrachloroethane. It is not necessary for an HCl acceptor to be in the reaction mixture, but it was often advantageous to use water to remove HCl from the organic phase and/or powdered calcium carbonate to neutralize the HCl. Less breakdown of the polymer during chlorination then occurs. After completion of the chlorination, the organic layer is washed with sodium bicarbonate solution to ensure the neutralization of all of the HCl which had been formed. If calcium carbonate has been used in the reaction mixture and some carbonate remained, it is first removed by filtration or by adding a little acetic acid. After the polymer solution is thoroughly washed with water to remove all salts, it is slowly added to methyl alcohol or some other non-solvent to precipitate the polymer as a white fibrous product.

Under the conditions which are employed in chlorinating these polymers, very little chlorination of the aromatic rings takes place. The chlorinated polymers consisted mainly of mixtures with the chlorine atoms attached to various positions of the alicyclic rings. Normally, the polymers become self-extinguishing when at least about 20% chlorine is present. However, lower chlorine contents still improve other properties of the polymer. By "self-extinguishing" it is meant that a film of the polymer stops burning almost immediately when it is removed from a flame. Polymers containing more chlorine are even more resistant to burning, and they can be prepared containing up to about 50% chlorine. The heat stability of the chlorinated polycarbonates may be improved by adding 0.1–4% of a compound of one or more of the following types: organo tin sulfur, organo tin, epoxy, aziridinyl, urea phosphite, unsaturated aliphatic, fatty acid salt (cadmium, zinc or tin), or powdered calcium carbonate. They may be added to films by dissolving or suspending in the dope from which the film is cast, or by dissolving or suspending in a solvent in which the polymer is insoluble (e.g., methanol), adding the polymer, and then evaporating to dryness.

The following specific examples illustrate but do not limit the invention. All inherent viscosities were measured in chloroform.

EXAMPLE 1

A polycarbonate prepared from 4,4'-(2-norbornylidene)-diphenol was chlorinated by the following procedure. The polymer (15.3 g., 0.05 mole based on the molecular weight of a polymer unit, inherent viscosity 1.80) was dissolved in 250 ml. of tetrachloroethane, and 125 ml. of water was added. While this mixture was stirred in a water bath and irradiated with a 275-watt ultraviolet lamp, chlorine was slowly passed in from a lecture bottle until the loss in weight of the cylinder was 17 g. This required about one hour. The reaction temperature was maintained at 18–22° C. by the water bath.

The tetrachloroethane layer was then stirred with sodium bicarbonate solution to neutralize the HCl which was present. After the polymer solution was thoroughly washed with water, it was slowly added to methyl alcohol to precipitate the polymer as a white fibrous material. It had an inherent viscosity of 0.80. The chlorine analysis indicated that 29.8% chlorine was present. A film, cast from methylene chloride, was self-extinguishing. The film had the following properties: tensile strength=11,700 p.s.i.; elongation=13.5%; modulus =4.3×10^5 p.s.i.; heat distortion temperature (2% extension) at 50 p.s.i.=252° C.

EXAMPLE 2

The polycarbonate used in Example 1 was chlorinated by a somewhat different procedure. The polymer (15.3 g., inherent viscosity 1.80) was dissolved in 300 ml. of chloroform, and 30 g. of powdered calcium carbonate was added. While this mixture was stirred in a water bath and irradiated with a 300-watt visible lamp, chlorine was slowly passed in until the weight loss of the lecture bottle was 20 g. The reaction temperature was held at 20-22° C. by the water bath. The mixture was then filtered to remove the excess calcium carbonate and salts. After the chloroform solution was washed with sodium bicarbonate solution, it was washed with water several times. The polymer was precipitated as a white fibrous material by slowly adding the solution to hexane. The polymer had an inherent viscosity of 0.94 and contained 20.4% chlorine. A film, cast from methylene chloride, was self-extinguishing. It had the following properties: tensile strength=10,400 p.s.i.; elongation=7%; modulus=3.7×10^5 p.s.i.; heat distortion temperature (2% shrinkage) at 50 p.s.i.=256° C.

EXAMPLE 3

A polycarbonate prepared from 4,4'-(hexahydro-4,7-methanoindan-5-ylidene)diphenol was chlorinated. The polymer (17.3 g., inherent viscosity 0.50) and 0.5 g. of acetyl peroxide were dissolved in 200 ml. of tetrachloroethane, and 200 ml. of water was added. While this mixture was stirred and irradiated with a 275-watt ultraviolet lamp, 18 g. of chlorine (measured as the weight loss of the lecture bottle) was added. The temperature of the reaction mixture was held at 28-32° C. by a water bath. The polymer solution was washed and the polymer isolated as in Example 1. It had an inherent viscosity of 0.44. A chlorine analysis indicated that 32.0% chlorine was present. A film, cast from methylene chloride, was self-extinguishing. It had the following properties: tensile strength=12,000 p.s.i.; elongation=5.5%; modulus=4.1×10^5 p.s.i.; heat distortion temperature (2% shrinkage) at 50 p.s.i.=265° C. When visible light (300-watt lamp) was used instead of ultraviolet, a polymer was obtained with substantially the same inherent viscosity and chlorine content.

EXAMPLE 4

A polycarbonate (inherent viscosity 0.91) prepared from 4,4'-(decahydro-1,4,5,8-dimethanonaphth-2-ylidene) diphenol was chlorinated according to the procedure of Example 3, using visible illumination. Calcium carbonate powder (13 g.) was also added to the reaction mixture. The product has an inherent viscosity of 0.62 and a chlorine analysis of 30.1%. A film, cast from methylene chloride, was self-extinguishing. It had the following properties: tensile strength=11,800 p.s.i.; elongation=5.4%; modulus=4.2×10^5 p.s.i.; heat distortion temperature (2% extension) at 50 p.s.i.=290° C.

EXAMPLE 5

A polycarbonate (inherent viscosity 0.84) prepared from 4,4'-(2-norbornylmethylene)diphenol was chlorinated according to the procedure of Example 1 using 35 g. of chlorine. The product has an inherent viscosity of 0.51 and a chlorine analysis of 44.6%. A film, cast from methylene chloride, was self-extinguishing. It had the following properties: tensile strength=11,700 p.s.i.; elongation=9.7%; modulus=4.5×10^5 p.s.i.; heat distortion temperature (2% extension) at 50 p.s.i.=263° C.

EXAMPLE 6

Example 3 was repeated without illumination. Whenever the chlorination slowed down, more acetyl peroxide (about 0.2 g.) was added. The final polymer had an inherent viscosity of 0.45 and a chlorine content of 30.1%.

EXAMPLE 7

The method of Example 1 was used for chlorinating a polyester prepared from 4,4'-(2-norbornylidene)diphenol and diphenyl terephthalate. The polyester had an inherent viscosity of 1.16 and weighed 20.5 g. (0.05 mole, based on the molecular weight of a polymer unit). The weight loss of the chlorine lecture bottle was 22 g. The chlorinated polyester had an inherent viscosity of 0.80 and contained 31.7% chlorine. A film, cast from methylene chloride, was self-extinguishing. The film had the following properties: tensile strength=12,000 p.s.i.; elongation=9%; modulus=4.0×10^5 p.s.i.

EXAMPLE 8

The procedure of Example 7 was used for chlorinating a polyester (inherent viscosity 0.92) prepared from 4,4'-(hexahydro-4,7-methanoindan-5-ylidene)diphenol and diphenyl trans-1,4-cyclohexanedicarboxylate. The chlorinated polymer had an inherent viscosity of 0.67 and contained 28.3% chlorine. A film, cast from methylene chloride, was self-extinguishing. It had the following properties: tensile strength=11,200 p.s.i.; elongation=7%, modulus=3.8×10^5 p.s.i.

The invention has been described in detail with particular reference to preferred embodiments thereof, but it will be understood that variations and modifications can be effected within the spirit and scope of the invention as described hereinabove and as defined in the appended claims.

We claim:
1. A process for preparing a chlorinated polyester, said process comprising (A) dissolving in a chlorinated hydrocarbon solvent a polyester having an inherent viscosity of at least 0.4 as measured in chloroform, and containing at least 10 percent of the recurring complex three-dimensional structural unit repreneted by the general formula:

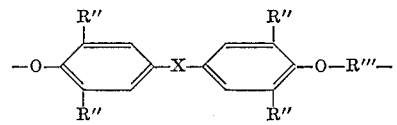

wherein the several R" may be the same or different and are members selected from the group consisting of hydrogen atoms, halogen atoms, and alkyl radicals containing from 1 to 4 carbon atoms, R''' is a member selected from the group consisting of (1) the residue of a dicarboxylic acid precursor having up to 40 carbon atoms and (2) a carbonyl group, X is a gem-bivalent radical having a saturated polycyclic three-dimensional structure which includes a saturated bicyclic atomic bridged hydrocarbon ring member, and (B) contacting the polyester with chlorine at a temperature of from about 0 to about 100° C. in the presence of a chlorination promoter selected from the group consisting of visible light, ultraviolet light and a free-radical catalyst.

2. The process of claim 1 wherein sufficient water is present to reduce the concentration of HCl in the organic phase and hence the tendency of the polyester to hydrolyze.

3. The process of claim 1 wherein $CaCO_3$ is dispersed in the reaction medium to neutralize the HCl formed.

4. The process of claim 2 wherein $CaCO_3$ is dispersed in the reaction medium to neutralize the HCl formed.

5. The process of claim 1 wherein the gem-bivalent radical has the structural formula:

6. The process of claim 1 wherein the gem-bivalent radical has the structural formula:

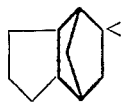

7. The process of claim 1 wherein the gem-bivalent radical has the structural formula:

8. The process of claim 1 wherein the gem-bivalent radical has the structural formula:

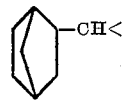

9. The process of claim 1 wherein the gem-bivalent radical has the structural formula:

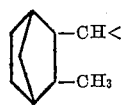

References Cited by the Examiner
UNITED STATES PATENTS

| | | | |
|---|---|---|---|
| 2,829,070 | 4/1958 | Osborn | 260—75 |
| 3,062,781 | 11/1962 | Bottenbrunch et al. | 260—47 |
| 3,075,949 | 1/1963 | Caldwell | 260—47 |
| 3,110,698 | 11/1963 | Laakso et al. | 260—47 |
| 3,251,803 | 5/1966 | Caldwell et al. | 260—47 |

SAMUEL H. BLECH, *Primary Examiner.*